United States Patent Office 3,542,780
Patented Nov. 24, 1970

3,542,780
2-AMIDINO-1,2,3,4-TETRAHYDROPYRAZINE
[1,2-a]INDOLES
Meier E. Freed, Philadelphia, and Elisabeth Hertz, Bryn
Mawr, Pa., assignors to American Home Products Corporation, New York, N.Y., a corporation of Delaware
No Drawing. Filed July 25, 1967, Ser. No. 655,762
Int. Cl. C07d 57/00
U.S. Cl. 260—268
12 Claims

ABSTRACT OF THE DISCLOSURE

The compounds of the class of 2-amidino-1,2,3,4-tetrahydropyrazino[1,2-a]indoles useful as a central nervous system stimulant as an analeptic in the treatment of intoxication induced by central nervous system depressant drugs.

BACKGROUND OF THE INVENTION

This invention relates to the field of new 2-amidino-1,2,3,4-tetrahydropyrazinol[1,2-a]indoles and the preparation thereof.

M. E. Freed in United States Pat. No. 3,317,524 discloses the preparation of 2-substituted 1,2,3,4-tetrahydropyrazino[1,2-a]indoles useful as anti-inflammatory agents, central nervous system depressants, analgesics and anticonvulsants.

SUMMARY OF THE INVENTION

More particularly, this invention is directed to compounds of the formula:

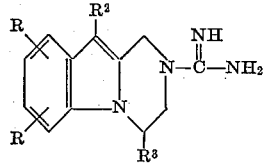

and the acid-addition salts thereof, wherein R and $R^1$ are each selected from the group consisting of hydrogen, lower alkyl, lower alkoxy, benzyloxy and halogen; $R^2$ is selected from the group consisting of hydrogen and lower alkyl; and $R^3$ is selected from the group consisting of hydrogen and methyl.

The terms "lower alkyl" and "lower alkoxy" related to those groups having less than five carbon atoms.

Among the suitable acid-addition salts include, inter alia, inorganic acids, such as the hydrohalide acids (e.g. hydrochloric and hydrobromic acid), sulphuric acid, nitric acid and phosphoric acid, and organic acids such as fumaric, tartaric and maleic acid.

The compounds of this invention are physiologically active substances which are useful in lieu of pentylenetetrazol as a central nervous system stimulant in barbiturate poisoning. When the compounds of this invention are employed as analeptic agents, they may be administered alone or in combination with acceptable carriers, the proportion of which is determined by the solubility and chemical nature of the compound, chosen route of administration and standard pharmaceutical practice. They may be administered orally, for example, in the form of solutions or they may be injected parenterally, that is intramuscularly, intravenously or subcutaneously. For parenteral administration, they may be used in the form of a sterile solution containing other solutes, for example, enough saline or glucose to make the solution isotonic.

The dosage of the present therapeutic agents will vary with the form of administration and the particular compound chosen. Furthermore, it will vary with the particular subject under treatment. In seriously poisoned patients in coma, the particular compound may be administered intravenously by continuous infusion at the rate of 1 or 2 mg. per minute until the corneal and swallowing reflexes appear or until very slight twitchings of the facial muscles or extremities occur, after which the administration of the compound is continued by intramuscular injection at intervals of fifteen to thirty minutes, depending upon the course of recovery. In general, treatment must be carefully individualized. However, the overall objective is to restore and continuously maintain active reflexes, spontaneous involuntary movement, and responsiveness to pain until sufficient barbiturate is eliminated to ensure recovery, and yet not to produce convulsive twitchings from an overdose. This necessitates careful and close observation of the patient and good judgment in the selection of doses and intervals between doses. An attempt should not be made to restore the patient to consciousness by drug therapy since convulsions will normally occur if this is tried. Alternatively, however, analeptic therapy should not be indefinitely withheld from a patient who is in a deep coma from barbiturate poisoning.

DESCRIPTION OF THE PREFERRED EMBODIMENTS

In accordance with one feature of this invention, the final products of this invention may be prepared according to the following reaction scheme wherein R, $R^1$, $R^2$ and $R^3$ are as hereinbefore defined:

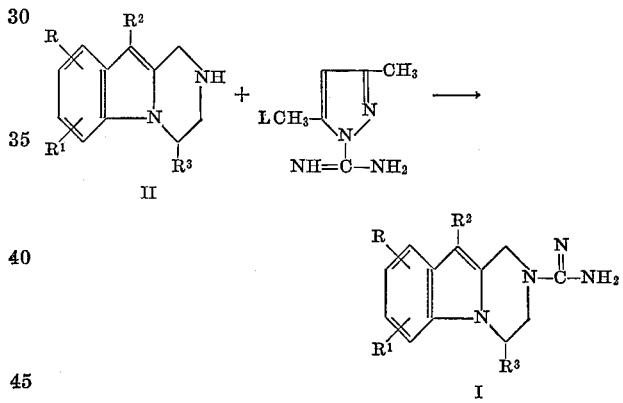

According to one feature of this invention the 1,2,3,4-tetrahydropyrazino[1,2-a]indole of Formula II is reacted with 3,5-dimethyl-1-guanylpyrazol or its salt, preferably at a temperature between 100° C. and 150° C., to yield the final products of Formula I.

The initial compounds of Formula II may be prepared in accordance with the procedure described in said U.S. patent 3,317,524. The 3,5-dimethyl-1-guanylpyrazole compound may be prepared in accordance with the procedure disclosed by A. F. S. A. Habeeb in Biochem. Biophys. Acta 34, 294 (1959).

In accordance with another feature of this invention the compounds of this invention may be prepared by reacting the 1,2 3,4 - tetrahydropyrazino[1,2-a]indole of Formula II with a compound selected from the group consisting of $CNNH_2$ and

wherein X is an anion selected from the group consisting of halogen, sulfate and nitrate.

The following examples illustrate the invention (all temperatures being in centigrade):

EXAMPLE 1

2-amidino-1,2,3,4-tetrahydropyrazino[1,2-a]indole, nitrate

A mixture of 1,2,3,4-tetrahydropyrazino[1,2-a]indole (5.17 gm., 0.03 mole) and 1 - amidino-3,5-dimethylpyrazole nitrate (3 gm., 0.015 mole) is heated in a 100 ml. round bottomed flask by placing in an oil bath heated to 150° C. The temperature is raised to 115–120° C. at which point a melt formed and immediately resolidified. Heating is continued for 15 minutes and the flask is then removed from the bath and allowed to cool. The contents of the flask is removed and pulverized and extracted well with ether. The insoluble material is filtered off, washed with ether, dried and recrystallized from ethanol to yield 1.8 gm. (43%) of 2-amidino-1,2,3,4-tetrahydropyrazino[1,2-a]indole, nitrate, M.P. 171–172° C.

Analysis.—Calcd. for $C_{12}H_{15}N_5O_3$ (percent): C, 51.98; H, 5.45; N, 25.26. Found (percent): C, 52.06; H, 5.66; N, 24.90.

EXAMPLE 2

2-amidino-8-chloro-1,2,3,4-tetrahydropyrazino[1,2-a]indole, nitrate

Following the procedure of Example 1, but substituting 8-chloro - 1,2,3,4 - tetrahydropyrazino[1,2-a]indole for 1,2,3,4 - tetrahydropyrazino[1,2-a]idole there is obtained 2-amidino-8-chloro - 1,2,3,4 - tetrahydropyrazino[1,2-a]indole, nitrate.

EXAMPLE 3

2-amidino-8-methoxy-1,2,3,4-tetrahydropyrazino[1,2-a]indole, nitrate

Following the procedure of Example 1 but substituting 8-methoxy-1,2,3,4 - tetrahydropyrazino[1,2-a]indole for 1,2,3,4 - tetrahydropyrazino[1,2-a]indole there is obtained 2-amidino-8-methoxy-1,2,3,4 - tetrahydropyrazino[1,2-a]indole, nitrate.

EXAMPLE 4

2-amidino-8-benzyloxy-1,2,3,4-tetrahydropyrazino[1,2-a]indole, nitrate

Following the procedure of Example 1, but substituting 8 - benzyloxy - 1,2,3,4 - tetrahydropyrazino[1,2-a]indole for 1,2,3,4-tetrahydropyrazino[1,2-a]indole there is obtained 2-amidino - 8-benzyloxy - 1,2,3,4 - tetrahydropyrazino[1,2-a]indole, nitrate.

EXAMPLE 5

2-amidino-10-methyl-1,2,3,4-tetrahydropyrazino[1,2-a]indole, nitrate

Following the procedure of Example 1, but substituting 10-methyl - 1,2,3,4 - tetrahydropyrazino[1,2-a]indole for 1,2,3,4 - tetrahydropyrazino[1,2-a]indole there is obtained 2-amidino-10-methyl - 1,2,3,4-tetrahydropyrazino[1,2-a]indole, nitrate.

EXAMPLE 6

2-amidino-4-methyl-1,2,3,4-tetrahydropyrazino[1,2-a]indole, nitrate

Following the procedure of Example 1, but substituting 4 - methyl - 1,2,3,4 - tetrahydropyrazino[1,2-a]indole for 1,2,3,4-tetrahydropyrazino[1,2-a]indole there is obtained 2-amidino-4 - methyl - 1,2,3,4 - tetrahydropyrazino[1,2-a]indole, nitrate.

EXAMPLE 7

2-amidino-10-propyl-1,2,3,4-tetrahydropyrazino[1,2-a]indole, nitrate

Following the procedure of Example 1, but substituting 10-propyl - 1,2,3,4 - tetrahydropyrazino[1,2-a]indole for 1,2,3,4 - tetrahydropyrazino[1,2-a]indole there is obtained 2-amidino-10-propyl - 1,2,3,4-tetrahydropyrazino[1,2-a]indole, nitrate.

EXAMPLE 8

2-amidino-7,8-dimethoxy-1,2,3,4-tetrahydropyrazino[1,2-a]indole, nitrate

Following the procedure of Example 1, but substituting 7,8-dimethoxy - 1,2,3,4 - tetrahydropyrazino[1,2-a]indole for 1,2,3,4-tetrahydropyrazino[1,2-a]indole there is obtained 2-amidino-7,8 - dimethoxy - 1,2,3,4-tetrahydropyrazino[1,2-a]indole, nitrate.

EXAMPLE 9

2-amidino-7,8-diethoxy-1,2,3,4-tetrahydropyrazino[1,2-a]indole, nitrate

Following the procedure of Example 1, but substituting 7,8 - diethoxy - 1,2,3,4 - tetrahydropyrazino[1,2-a]indole for 1,2,3,4-tetrahydropyrazino[1,2-a]indole there is obtained 2-amidino-7,8-diethoxy - 1,2,3,4 - tetrahydropyrazino[1,2-a]indole, nitrate.

EXAMPLE 10

2-amidino-7,8-dichloro-1,2,3,4-tetrahydropyrazino[1,2-a]indole, nitrate

Following the procedure of Example 1, but substituting 7,8 - dichloro - 1,2,3,4 - tetrahydropyrazino[1,2-a]indole for 1,2,3,4-tetrahydropyrazino[1,2-a]indole there is obtained 2-amidino-7,8-dichloro - 1,2,3,4-tetrahydropyrazino[1,2-a]indole, nitrate.

EXAMPLE 11

2-amidino-7,8-dibromo-1,2,3,4-tetrahydropyrazino[1,2-a]indole, nitrate

Following the procedure of Example 1, but substituting 7,8 - dibromo - 1,2,3,4 - tetrahydropyrazino[1,2-a]indole for 1,2,3,4-tetrahydropyrazino[1,2-a]indole there is obtained 2-amidino-7,8-dibromo - 1,2,3,4 - tetrahydropyrazino[1,2-a]indole, nitrate.

EXAMPLE 12

2-amidino-7-methyl-8-ethyl-1,2,3,4-tetrahydropyrazino[1,2-a]indole, nitrate

Following the procedure of Example 1, but substituting 7-methyl-8-ethyl - 1,2,3,4-tetrahydropyrazino[1,2-a]indole for 1,2,3,4-tetrahydropyrazino[1,2-a]indole there is obtained 2-amidino-7-methyl-8-ethyl - 1,2,3,4 - tetrahydropyrazino[1,2-a]indole, nitrate.

EXAMPLE 13

2-amidino-4-methyl-8-methoxy-1,2,3,4-tetrahydropyrazino[1,2-a]indole, nitrate Following the procedure of Example 1, but substituting 4-methyl-8 - methoxy - 1,2,3,4 - tetrahydropyrazino[1,2-a]indole for 1,2,3,4 - tetrahydropyrazino[1,2-a]indole there is obtained 2 - amidino-4-methyl-8-methoxy-1,2,3,4-tetrahydropyrazino[1,2-a]indole, nitrate.

EXAMPLE 14

2-amidino-10-ethyl-7,8-dimethoxy-1,2,3,4-tetrahydropyrazino[1,2-a]indole, nitrate Following the procedure of Example 1, but substituting 10-ethyl - 7,8 - dimethoxy-1,2,3,4-tetrahydropyrazino[1,2-a]indole for 1,2,3,4 - tetrahydropyrazino[1,2-a]indole there is obtained 2-amidino-10-ethyl-7,8-dimethoxy-1,2,3,4-tetrahydropyrazino[1,2-a]indole, nitrate.

EXAMPLE 15

2-amidino-4-methyl-8-benzyloxy-1,2,3,4-tetrahydropyrazino[1,2-a]indole, nitrate Following the procedue of Example 1, but substituting 4-methyl-8-benzyloxy - 1,2,3,4 - tetrahydropyrazino[1,2-a]indole for 1,2,3,4 - tetrahydropyrazino[1,2-a]indole there is obtained 2-amidino-4-methyl-8-benzyloxy-1,2,3,4-tetrahydropyrazino[1,2-a]indole, nitrate.

It is understood that the compounds of Examples 1 through 15 may be converted to their base form by any conventional method such as by treatment with a dilute base.

It is further understood that by conventional methods the compounds of Examples 1 through 15 may be converted from the nitrate salt to another acid-addition salt form.

The invention may be variously otherwise embodied within the scope of the appended claims.

What is claimed is:

1. A compound selected from the group consisting of:

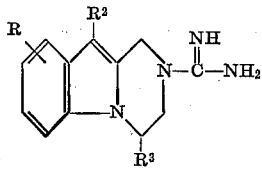

and the pharmaceutically acceptable acid-addition salts thereof, wherein R is selected from the group consisting of hydrogen, lower alkyl, lower alkoxy, benzyloxy and halogen; $R^2$ is hydrogen; and $R^3$ is selected from the group consisting of hydrogen and methyl.

2. A compound according to claim 1 that is the acid-addition salt of 2-amidino-8-chloro-1,2,3,4 - tetrahydropyrazino[1,2-a]indole.

3. A compound according to claim 1 that is 2-amidino-8 - chloro - 1,2,3,4 - tetrahydropyrazino[1,2-a]indole, mono-nitrate.

4. A compound according to claim 1 that is 2-amidino-8 - methoxy - 1,2,3,4 - tetrahydropyrazino[1,2-a]indole, mono-nitrate.

5. A compound according to claim 1 that is 2-amidino-10-methyl - 1,2,3,4 - tetrahydropyrazino[1,2-a]indole, mono-nitrate.

6. A compound according to claim 1 that is 2-amidino-4-methyl - 1,2,3,4 - tetrahydropyrazino[1,2-a]indole, mono-nitrate.

7. A compound according to claim 1 that is 2-amidino - 7,8 - dimethoxy - 1,2,3,4 - tetrahydropyrazino [1,2-a]indole, mono-nitrate.

8. A compound according to claim 1 that is 2-amidino - 7,8 - diethoxy - 1,2,3,4 - tetrahydropyrazino [1,2-a]indole, mono-nitrate.

9. A compound according to claim 1 that is 2-amidino - 10-ethyl - 7,8 - dimethoxy - 1,2,3,4 - tetrahydropyrazino[1,2-a]indole, mono-nitrate.

10. A compound according to claim 1 that is 2-amidino-4-methyl - 8 - benzyloxy - 1,2,3,4 - tetrahydropyrazino[1,2-a]indole, mono-nitrate.

11. A compound according to claim 1 that is 2-amidino-1,2,3,4 - tetrahydropyrazino[1,2-a]indole, mono-nitrate.

12. A compound according to claim 1 that is the acid addition salt of 2-amidino - 1,2,3,4 - tetrahydropyrazino[1,2-a]indole.

References Cited

UNITED STATES PATENTS

| | | | |
|---|---|---|---|
| 2,861,072 | 11/1958 | Weston | 260—268 |
| 3,164,598 | 1/1965 | Freed | 260—268 |
| 3,176,017 | 3/1965 | Freed | 260—268 |
| 3,317,524 | 5/1967 | Freed | 424—250 |
| 3,388,128 | 6/1968 | Day et al. | 260—268 |

DONALD G. DAUS, Primary Examiner

U.S. Cl. X.R.

260—310, 564; 424—250

PO-1050
(5/69)

UNITED STATES PATENT OFFICE
CERTIFICATE OF CORRECTION

Patent No. 3,542,780      Dated March 26, 1971

Inventor(s) Meier E. Freed and Elisabeth Hertz

It is certified that error appears in the above-identified patent and that said Letters Patent are hereby corrected as shown below:

In column 1, formula I after line 30 should read:

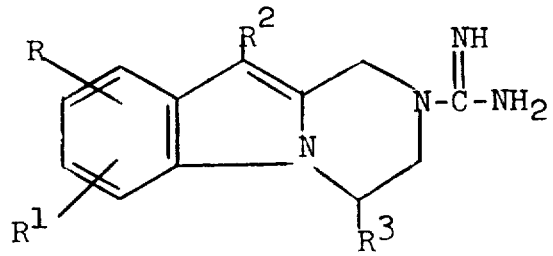

In column 2 after line 28 the formula for the reactant should read:

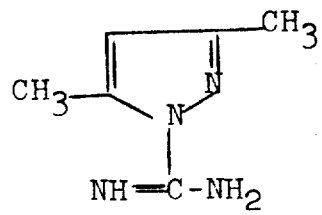

In column 2 after line 28 formula I should read:

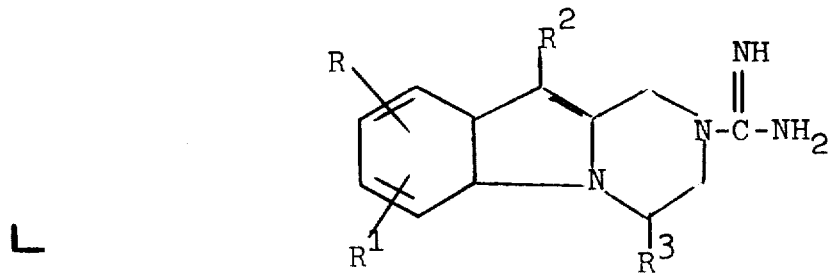

Signed and sealed this 6th day of July 1971.

(SEAL)
Attest:

EDWARD M. FLETCHER, JR.
Attesting Officer

WILLIAM E. SCHUYLER
Commissioner of Pat